T. I. DUFFY.
SHOCK ABSORBER.
APPLICATION FILED JAN. 27, 1915.
1,182,463.
Patented May 9, 1916.
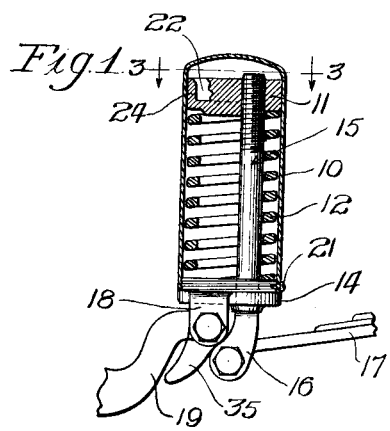
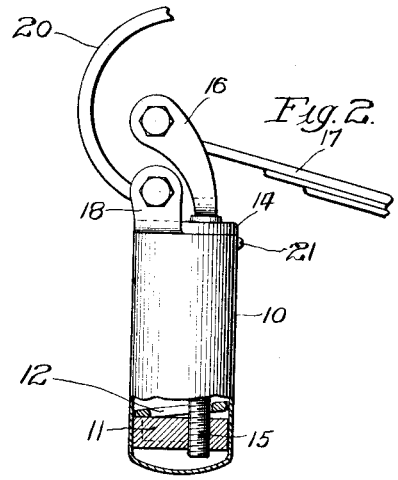
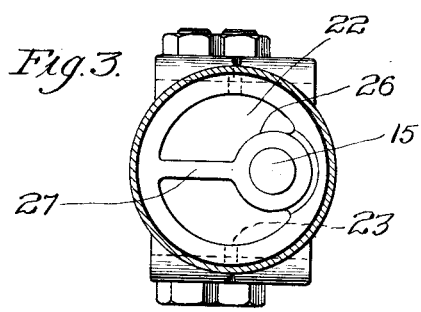
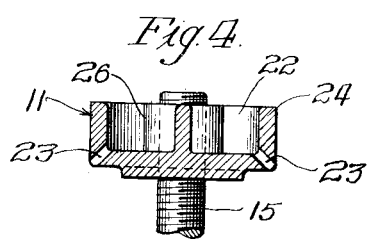
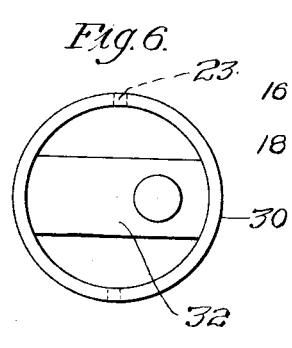
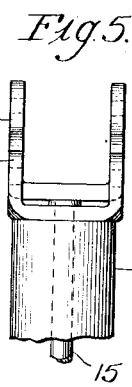
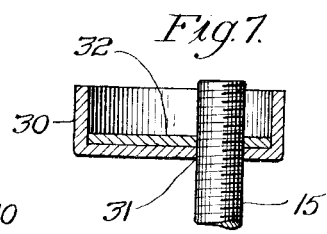
Witnesses:
G. C. Higham.
G. E. Dowle.
Inventor
Thomas I. Duffy
by William W. Hall
Atty.

UNITED STATES PATENT OFFICE.

THOMAS I. DUFFY, OF CHICAGO, ILLINOIS, ASSIGNOR TO BAKER DUFFY COMPANY, OF CHICAGO, ILLINOIS, A CORPORATION OF ILLINOIS.

SHOCK-ABSORBER.

1,182,463.     Specification of Letters Patent.     Patented May 9, 1916.

Application filed January 27, 1915. Serial No. 4,591.

*To all whom it may concern:*

Be it known that I, THOMAS I. DUFFY, a citizen of the United States, and a resident of Chicago, in the county of Cook and State of Illinois, have invented certain new and useful Improvements in Shock-Absorbers; and I do hereby declare that the following is a full, clear, and exact description thereof, reference being had to the accompanying drawings, and to the characters of reference marked thereon, which form a part of this specification.

This invention relates to improvements in shock absorbers for vehicles designed to be connected between the spring members of the vehicle or between a spring member and a spring hanger connected to a vehicle frame or axle to absorb the minor shocks which are not absorbed by the regular springs of the vehicle.

Among the objects of the invention is to provide a shock absorber for this purpose which is adapted to be used with standard springs in lieu of the usual shackles for connecting the spring members or for connecting a spring member to the spring hanger.

Another object of the invention is to provide an improved construction in shock absorbers which enables the device, as a whole, to be reduced in length without sacrificing its capacity for adjustment to fixed dimensions of standard car construction.

Another object of the invention is to provide an improved shock absorber construction whereby the spring element of the absorber may be adjusted and the parts locked in adjusted position.

A further object of the invention is to provide a novel means of lubricating the relatively movable parts of the absorber structure.

Other objects of the invention are to improve, simplify and reduce the cost of shock absorbers, and the invention consists in the matters hereinafter set forth and more particularly pointed out in the appended claims.

In the drawings, Figure 1 is a partial axial section and partial side elevation of a shock absorber embodying my invention as applied to one type of spring. Fig. 2 is a partial side elevation and partial section thereof as applied to another type of spring. Fig. 3 is an enlarged section on the line 3—3 of Fig. 1. Fig. 4 is a sectional view of the plunger and a portion of the plunger rod. Fig. 5 is a side elevation of the upper portion of the shock absorber shown in Fig. 2. Fig. 6 is a view similar to Fig. 3, showing a modification. Fig. 7 is an axial section of said modification.

A preferred embodiment of shock absorber, herein shown, embodying my invention comprises, as its main or principal elements, a casing or frame 10, a plunger 11 slidable therein, a helical spring 12 interposed between said plunger and a base 14 which constitutes one end wall of the casing, a plunger rod 15 attached to the plunger and extending through the base and provided at its outer end with a spring yoke or lug 16 adapted to be connected to a member 17 of the spring, and a yoke or lug 18 made integral with the base 14 and adapted to be connected to a hanger arm 19 of the vehicle, as shown in Fig. 1, or to the other member 20 of the spring, as shown in Fig. 2. Preferably and as shown, the yoke 16 is made an integral part of the plunger rod 15. The casing 10 is preferably made of sheet metal by a suitable swaging operation. It is closed at its upper end and is open at its lower end, and is internally screw-threaded at its lower end to engage external screw-threads on the base 14 by which the base is attached to the casing. The casing may be additionally locked to said base by means of a lock screw 21. The plunger rod is attached to the plunger by providing the plunger with a screw threaded aperture to receive the screw-threaded upper end of the rod. This construction enables the spring 12 to be adjusted by turning the plunger on the plunger rod toward or from the spring, as desired.

In accordance with one phase of my invention the said plunger rod is attached to the plunger eccentrically of the latter and extends through an eccentrically disposed guide opening in the base 14. It also lies at one side of the axial center of the spring 12, as shown in Figs. 1 and 2. The eccentric arrangement of the plunger rod with respect to the plunger and the casing permits the plunger rod yoke 16 and the base yoke 18 to be nested closely together, as indicated in Figs. 1 and 2, and avoids the necessity of extending the yoke 16 much beyond the base yoke 18, so that thereby the over all dimensions of the device may be kept within a minimum space. The outer ends of the yoke arms 17 are shown as curved toward the yoke arms 18. The particular relation of the yoke arms, however, will depend upon the type of springs to which the shock absorber is to be applied.

The shock absorber shown in Fig. 1 is adapted to the Ford type of spring, and in this type the ends of the yokes 16 and 18 are brought close together so as to engage the shackle bolts without varying the positions or relation of the latter. Therefore, no necessity arises to supply new shackle arms or fixtures. The shock absorber shown in Fig. 2 is adapted to the scroll type of elliptical spring, and in this arrangement the ends of the yokes are usually spaced somewhat farther apart. In both forms of the device the connecting yokes 16 and 18 are displaced or off-set, relatively to the parts to which they are fixed, toward the same side of the device. This construction enables the yokes to be made relatively short while permitting them to be connected to spring members and hangers of standard constructions without the necessity of supplying auxiliary adapting devices.

The eccentric attachment of the plunger rod to the plunger permits the plunger to be locked relatively to the plunger rod and to the casing in any position to which it may be turned to adjust the spring 12. Thus, when the strength of the spring is to be varied, the casing 10 is removed and the plunger 11 is turned one or more full turns on the screw-threaded end of the plunger rod. Thereafter, when the casing is again screwed in place, the plunger cannot turn relatively to the casing and is, therefore, locked to maintain the spring in a given adjustment. The casing 10 constitutes a supporting frame for the spring, the plunger and its stem and it will be obvious that so far as its supporting functions are concerned it may or may not wholly inclose said parts.

In order to conveniently lubricate the parts of the device which slide one upon the other, the plunger is shown as made hollow to form a grease cup 22. In the device shown in Fig. 1 the recessed cup portion 22 is formed on the outer upper side of the plunger, while in the device shown in Fig. 2 said cup shaped or recessed portion is formed in the inner upper side of the plunger. Feed openings 23, 23 lead from the cup 22 through the wall 24 thereof so as to permit the grease contained in the cup to be fed to the space between the plunger and the inner wall of the casing to properly lubricate the same. Said plunger recess is freely open and unobstructed at its upper side to receive a charge of grease and said recess is open to the interior of the casing so that if the charge of grease should more than fill the recess or cup it will be held in place by the casing and fall into the recess to be used as the supply is exhausted from the bottom of the recess. In order that the plunger, provided with the grease cup described, may be suitably strengthened, it may be provided with a thickened portion or lug 26 in which is formed the screw-threaded opening to receive the rod 15, and with a rib 27 for connecting said lug with the opposite wall of the cup like plunger.

In some instances the plunger may be made principally of sheet metal, as shown in Fig. 6, instead of being cast in one piece as shown in the other figures. As shown in Fig. 6, 30 designates a stamped sheet metal cup, the bottom wall of which is provided with an eccentrically disposed opening 31 to loosely receive the plunger 15. 32 designates a bar which extends across the said cup and is provided near one end with a screw-threaded opening for screw-threaded engagement with the screw-threaded end of the plunger 15. The ends of the bar engage the wall of the cup, or other shoulders therein and the bar is thereby prevented from turning relatively to the cup. This arrangement materially decreases the cost of the plunger. It lends itself more readily to the type of absorber shown in Fig. 1 than to the pendant type of shock absorber.

In some instances it may be desirable to provide the casing lugs 18 with an extension 35 to serve as a stop to limit the swinging movement of the casing as, for instance, where the car structure is such that a substantial swinging movement of the casing brings the same up against a part of the car body which may be thereby marred or injured. Such stop extension is more particularly adapted to the upright type of device, as shown in Fig. 1.

The device described is capable of being made at a moderate cost, and the construction is such that it is very strong and compact.

It will be understood that the structural details are capable of variation without departure from the spirit of the invention, and that the invention is not limited to such details except as made the subject of specific claims or as imposed by the prior art.

I claim as my invention:—

1. A shock absorber for vehicles comprising a casing provided with means for connection to a spring hanger or a spring member, a plunger slidable in said casing, a spring between said plunger and an abutment in said casing and a plunger rod attached to said plunger eccentrically thereof and extending beyond the casing and provided with means to connect it to a spring member or hanger.

2. A shock absorber for vehicles comprising a closed ended casing provided with means for connection to a spring hanger or a spring member, a plunger slidable in said casing, a spring in the casing and interposed between the closed end of the casing and the said plunger and a plunger rod attached to said plunger eccentrically thereof and extending eccentrically through the closed end of the casing and provided beyond said end with means to connect it to a spring member or hanger.

3. In a shock absorber, the combination with a casing, a sliding plunger therein, a spring between the plunger and an abutment in the said casing and a plunger rod screw-threaded to the plunger at one side of the center thereof, whereby the compression of the spring may be adjusted and the spring locked in adjusted position.

4. A shock absorber for vehicles comprising a casing having means to connect it to a spring hanger or a spring member, a sliding plunger in the casing, a spring between the plunger and one end wall of the casing and a plunger rod extending through an opening in said end wall and through the spring and screw-threaded to the plunger at one side of the center thereof.

5. A shock absorber for vehicles comprising a base provided with means to attach it to a spring hanger or a spring member, a casing detachably connected to the base, a plunger slidable therein, a spring between the base and the plunger and a plunger rod extending through an eccentrically disposed opening in said base and through said spring and attached to the plunger at one side of the center thereof.

6. A shock absorber for vehicles comprising a casing provided with means for connecting it to a spring hanger or spring member, a plunger slidable in said casing, a yielding element between the plunger and an abutment of the casing and a plunger rod attached to the plunger and extending beyond the casing and provided at its end with means to connect it to a spring member or hanger, the connecting means of both the plunger and casing being off-set toward one and the same side of the casing.

7. A shock absorber for vehicles comprising a casing provided with a connecting yoke or lug, a sliding plunger in the casing, a yielding element between the plunger and an abutment of the casing, a rod attached to the plunger and provided beyond the casing with a yoke, the yokes of the casing and plunger being off-set toward the same side of the casing.

8. In a shock absorber for vehicle springs, a frame, a plunger fitting therein, a spring between the plunger and an abutment on the frame and a plunger rod attached to the plunger, with means for connecting the frame and the plunger rod to the spring members or to a spring member and a spring hanger, said plunger being recessed at its top to form an upwardly opening grease cup which is freely open and unobstructed to receive a charge of grease and having in the outer side wall thereof at its bottom an opening to direct grease directly to the space between the plunger and the inner casing wall.

9. In a shock absorber for vehicle springs, a casing, a plunger fitting and sliding therein, a spring between the plunger and an abutment in the casing and a plunger rod screw-threaded at its end, with means for connecting the casing and the plunger rod to the spring members or to a spring member and a spring hanger, said plunger comprising a sheet metal cup having an eccentric opening for the free passage of said plunger rod, and a bar extending across said cup and having at one end a screw-threaded opening to engage the screw-threaded end of the plunger rod.

10. In a shock absorber a casing, a spring held sliding plunger therein, a yoke on the casing for pivotal connection to a spring hanger or member, a plunger rod attached to said plunger and having a yoke adapted for pivotal conection to a spring member or hanger and a stop extension on one of said yokes adapted for engagement with a fixed part of the spring mounting to hold the casing from tilting when the vehicle spring is loaded.

In testimony that I claim the foregoing as my invention I affix my signature in the presence of two witnesses, this 2nd day of January, A. D. 1915.

THOMAS I. DUFFY.

Witnesses:
W. L. HALL,
G. E. DOWLE.